United States Patent
Hsyu et al.

(10) Patent No.: US 7,885,666 B2
(45) Date of Patent: Feb. 8, 2011

(54) METHOD AND APPARATUS FOR DETERMINING THE NEW SAMPLE POINTS OF THE LOCATION DETERMINATION SYSTEM IN A WIRELESS ENVIRONMENT

(75) Inventors: Ming-Chun Hsyu, Taichung (TW); Wen Tsuei, Hsinchu (TW); Chao-Nan Chen, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 828 days.

(21) Appl. No.: 11/750,995

(22) Filed: May 18, 2007

(65) Prior Publication Data

US 2008/0162086 A1    Jul. 3, 2008

(30) Foreign Application Priority Data

Dec. 28, 2006    (TW) .............................. 95149504 A

(51) Int. Cl.
*H04W 24/00* (2009.01)
*H03F 1/26* (2006.01)

(52) U.S. Cl. ................................... 455/456.1; 702/189

(58) Field of Classification Search .............. 455/456.1; 702/189
See application file for complete search history.

(56) References Cited

U.S. PATENT DOCUMENTS

2005/0128139 A1 * 6/2005 Misikangas et al. ......... 342/350
2005/0131635 A1 * 6/2005 Myllymaki et al. ......... 701/205

FOREIGN PATENT DOCUMENTS

TW        I247132       1/2006
WO     WO 03/102620    12/2003

OTHER PUBLICATIONS

Proc. 15th IEEE Int. Symposium on Personal, Indoor and Mobile Radio Communications, Barcelona, Spain, IEEE Press, 2004. Topics in Probabilistic Location Estimation Inwireless Networks Petri Kontkanen, Petri Myllym aki, Teemu Roos, Henry Tirri, Kimmo Valtonen, and HannesWettig.

(Continued)

*Primary Examiner*—Vincent P Harper
*Assistant Examiner*—Timothy Pham

(57) ABSTRACT

Disclosed is a method and apparatus for determining the new sample points of the location determination system in a wireless environment. In the training phase, after knowing the distribution of the observed radio signal of a location for a target device, the uncertainty of the probability distribution of the received radio signal is analyzed by a location probability distribution model. The radio signal distribution differences are calculated, and the penalties between the location in question and its nearby locations are also calculated, thereby determining whether a location is the candidate of new sample points or the recalibration points. This invention has nothing to do with decision rules and will not undergo the problems of choosing inappropriate decision rules. It also provides a penalty model for generating penalty of error prediction from one location to another location, which can as well easily mitigate the problem on the sample points with the double-role attribute of the border line.

11 Claims, 9 Drawing Sheets

OTHER PUBLICATIONS

Moustafa Youssef and Ashok Agrawala. "On the Optimality of WLAN Location Determination Systems" Technical Report UMIACS-TR 2003-29 and CS-TR 4459, University of Maryland, College Park, Mar. 2003.

On the Optimality of WLAN Location Determination Systems Moustafa A. Youssef, Ashok Agrawala Department of Comupter Science and UMIACS University of Maryland College Park, Maryland 20742 UMIACS-TR-2003-29 and CS-TR-4459 Mar. 11, 2003.

Cover, T. M. and Thomas, J. A. Elements of Information Theory. New York: Wiley, 1991,Chaper 2.

* cited by examiner

| POSSIBLE LOCATION POSSIBLE SIGNAL | SP1 | SP2 | SP3 | SP4 |
|---|---|---|---|---|
| 1 | $p(1\|SP1) = 0.7$ | $p(1\|SP2) = 0.05$ | 0.05 | 0.1 |
| 2 | $p(2\|SP1) = 0.2$ | 0.6 | 0.4 | 0.03 |
| 3 | 0.05 | 0.3 | 0.5 | 0.07 |
| 4 | 0.05 | 0.05 | 0.05 | 0.8 |

FIG.5A

| POSSIBLE LOCATION / POSSIBLE LOCATION | SP1 | SP2 | SP3 | SP4 |
|---|---|---|---|---|
| SP1 | $d(SP1, SP1) = 0$ | $d(SP1, SP2) = 1$ | $\sqrt{2}$ | 1 |
| SP2 | $d(SP2, SP1) = 1$ | 0 | 1 | $\sqrt{2}$ |
| SP3 | $\sqrt{2}$ | 1 | 0 | 1 |
| SP4 | 1 | $\sqrt{2}$ | 1 | 0 |

FIG.5B

| ENTROPY VALUE | $H(O|SP1)$ | $H(O|SP2)$ | $H(O|SP3)$ | $H(O|SP3)$ |
|---|---|---|---|---|
| | 1.2568 | 1.3955 | 1.4610 | 1.0101 |

FIG.5C

| POSSIBLE LOCATION / POSSIBLE LOCATION | SP1 | SP2 | SP3 | SP4 |
|---|---|---|---|---|
| SP1 | 0 | 2.2189 | 2.2991 | 2.2883 |
| SP2 | 1.5361 | 0 | 0.1299 | 2.9730 |
| SP3 | 1.8706 | 0.1345 | 0 | 2.6630 |
| SP4 | 2.8711 | 3.0234 | 2.9893 | 0 |

FIG.5D

| CALIBRATION INDEX | $I(SP1)$ | $I(SP2)$ | $I(SP3)$ | $I(SP4)$ |
|---|---|---|---|---|
| | 2.2902 | 7.0251 | 7.2237 | 1.7313 |

FIG.5E

METHOD AND APPARATUS FOR DETERMINING THE NEW SAMPLE POINTS OF THE LOCATION DETERMINATION SYSTEM IN A WIRELESS ENVIRONMENT

FIELD OF THE INVENTION

The present invention generally relates to a method for determining the new sample points of a location determination system in a wireless environment.

BACKGROUND OF THE INVENTION

To estimate the location of a target device, a location determination system must estimate a quantity. The quantity must be at least a function of distance. The quantity can be the strength of the signal from the access point (AP). The signal strength will logarithmically decay in accordance with the distance in a free space. The location determination technique is based on the observation of the received radio signal at the target device. In general, the observations at a location form a probabilistic model. The probabilistic model describes the distribution of the received radio signal.

The distribution of the observation at each sample point (SP) usually approximates the radio signals in the nearby regions. To establish the probabilistic model of each SP, it is necessary to collect radio data at each SP. However, most environments usually use a large amount of sample points; therefore, it is impractical to collect the radio data. In general, physical measurements are taken only at a few SPs, and then a simulation or theoretical calculation is performed to obtain the probabilistic distribution of other SPs. For example, the interpolation or extrapolation is performed on the physical measurements at the SPs to obtain the probabilistic distribution of other SPs. Therefore, the established probabilistic model depends on the "how many" and "where" aspects of the collected radio data.

The wireless location determining system usually uses two phases for processing. One is a training phase, and the other is a location determining phase. The training phase is an offline phase. During this phase, the system will extract the signatures of the AP at certain cells in the region, collect and analyze the signal pattern, and use a few SPs to estimate the map of the entire space. The map is known as radio map.

In the location determining phase, the target device compares the received signal strength of the AP with the radio map to determine the optimal match, such as the nearest candidate, to be used as the target device's estimated location.

World International Patent Publication WO03/102620 disclosed a method for determining the error estimate of the predicted location of a target device. The method is based on a probabilistic model and collected observations to determine the location of the target device. FIG. 1 shows the method of determining error estimate. As shown in FIG. 1, step 101 is to determine the posterior location probability distribution of the target device at a specific observation. Step 103 is to determine the error distance function between the true location and the target device's estimated location at the specific observation. Step 105 is to multiply the posterior location probability distribution with the distance function, and add the product to the error estimate. Finally, step 107 is to repeat the above steps in the physical area where the location determining system is operating.

The error distance estimation is determined by the expectation of the error distance between the sample points and the target device's estimated location in the physical area where the location determining system is operating. The error distance estimation can be used to determine whether new sample points should be added, or the existing sample points should be recalibrated. The point with the maximum expectation of error distance is the point needed to be sampled or recalibrated.

The error distance expectation is different for the different observations of the estimated location. Therefore, it is difficult for the error distance estimation to give good, objective, or effective suggestions on the new sample points, unless the optimal decision rule is taken into account. However, if the random mapping decision rule is used, it is not suitable to use the error distance expectation to differentiate the location based on the received signals because the expectation is independent of the selection of sample points based on the observed radio signals.

Furthermore, when location determining models in different environments are taken into account, the grid size of the sample points of different models used in location estimation can be inconsistent. Therefore, when the error distance estimation is used to recommend the potential locations, the decision rule of the error distance expectation will attempt to choose the sample points with a large grid size. Therefore, the sample points in the region of a small grid size will be ignored.

If the candidate selection is confined to the same location determining model, the sample points on the border lines will always be neglected in the region of a large grid size, or selected in the region of a small grid size. This is due to the double-role attribute of the sample points on the border lines.

Reducing the number of actually measured sample points is a key technology difference among the wireless location determining systems. However, if the location determining effect is not good after the training phase, new sample points must be added or calibrated.

SUMMARY OF THE INVENTION

The examples of the present invention may provide a method and an apparatus for determining the new sample points of the location determination system in a wireless environment. In the training phase, when the observation of the radio signals of the target device is known, the observation distribution can be applied to calculate the stability of the radio signals of the location, and the difference from the observation probability distribution of other observation points in order to determine whether a location is the candidate of new sample points.

After receiving the radio signal of an observation location, the stability of the radio signal can be described by the uncertainty of the probability distribution formed by the signal. The difference between the probability distributions of the radio signals of two locations can be calculated by the average of substituting each observation to a difference function. The difference function can be the absolute value of the subtraction of two values, the logarithmic difference between two values, or other similar functions. When considering the penalty of error prediction at different locations, the weight or penalty function and the difference of signal distribution of two locations can be combined together for consideration.

In one exemplary embodiment, the method for determining new sample points may comprise the following steps. The first step is to calculate the stability of the received radio signal at a location. The second step is to calculate the radio signal distribution difference and determine the penalties between the location and its nearby locations. The third step is to calculate the calibration index of the location. The final step is to repeat the above steps for all the locations in the physical area where the system is operating.

In another exemplary embodiment, the apparatus for determining new sample points may comprise a location probability distribution model indicating a location probability distribution function for the target device in the wireless system, a stability module for measuring the stability of a received radio signal of the target device at a location q, a penalty model for generating a penalty of error prediction between the location q of the received radio signal and its nearby locations, and a calibration module for producing a calibration index I(q) of the location q.

The present invention does not rely on the decision rules, and does not have problems caused by the wrong choice of decision rules. The present invention also provides the penalty mechanism of the error prediction of moving from one location to another location, and can solve the problem caused by the double-role attribute of the sample points on the border lines.

BRIEF DESCRIPTION OF THE DRAWINGS

The present invention can be understood in more detail by reading the subsequent detailed description in conjunction with the examples and references made to the accompanying drawings, wherein:

FIG. 5A shows the probability distributions of four sample points SP1-SP4 during the training phase;

FIG. 5B shows the mutual distance between the four sample points SP1-SP4;

FIG. 5C shows the information entropies of four sample points SP1-SP4;

FIG. 5D shows the calculated difference of each pair of probability distributions of four sample points SP1-SP4 by using Kullback-Leibler distance; and FIG. 5E shows the calibration indices of four sample points SP1-SP4.

DETAILED DESCRIPTION OF THE PREFERRED EMBODIMENTS

The present invention is to determine the new sample points of a target device during the training phase of a wireless location determination system. The location determining technique is to use the radio signal observation at a location of the target device as a basis. The observations at a location reported by the target device form a probability distribution, which is a conditional probability. In other words, the conditional probability $P(o_t = m_t | q_t = S_t)$ means the probability that the target device reports the observation $m_t$ at location $s_t$, and $q_t$ and $o_t$ are respectively the location and observation variables of the target device at time t.

Figure 1:
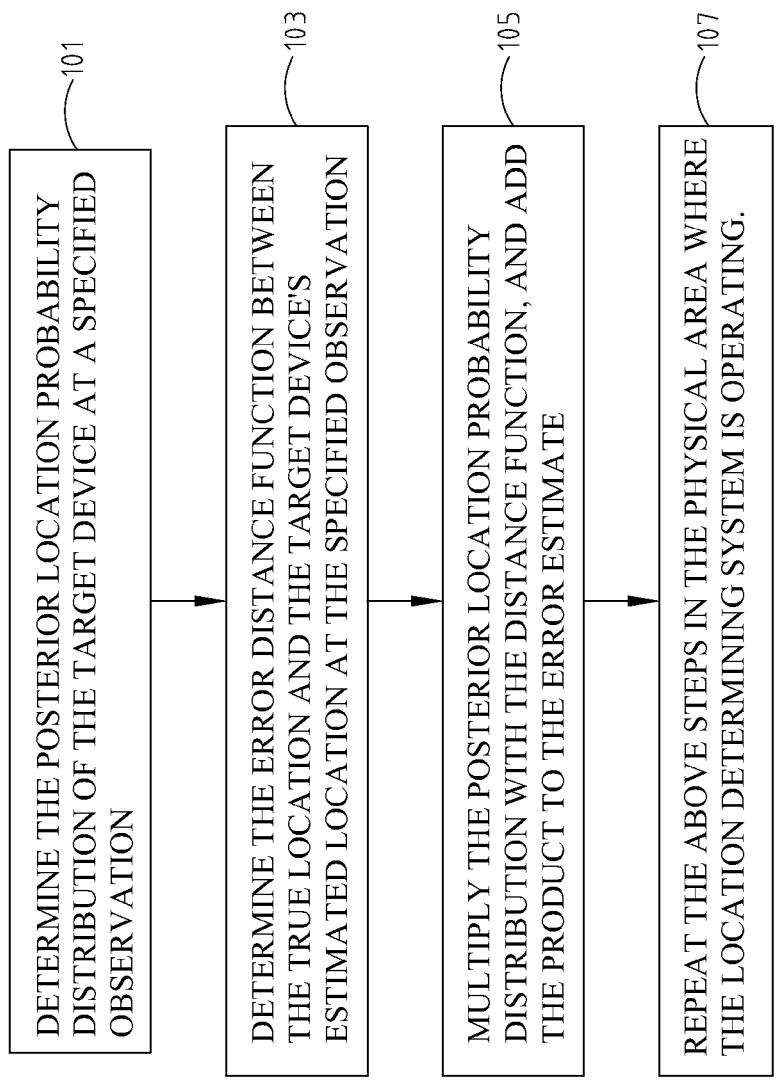
FIG. 1 shows a flowchart of a conventional method for determining the error estimation of a target device.
Figure 2:
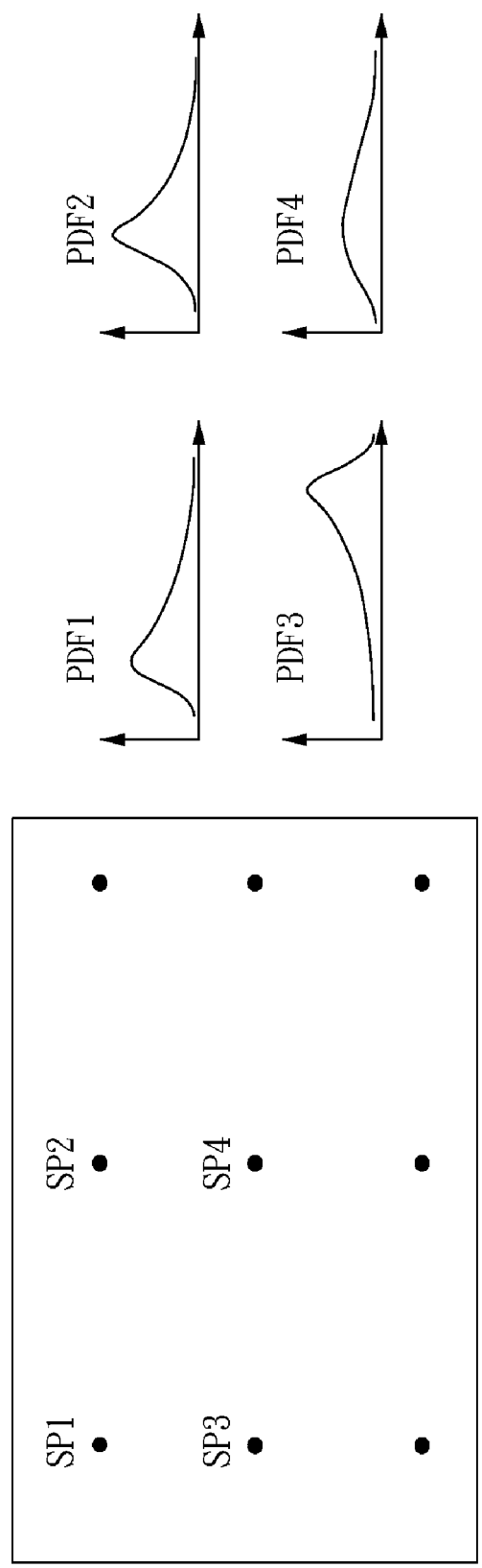
FIG. 2 shows four probability distributions corresponding to the radio signals received at four different locations.

The probability distributions corresponding to the radio signals at different locations are independent with each other. As shown in FIG. 2, the four probability distributions PDF1-PDF4, corresponding to the radio signal received at four different locations, such as four sample points SP1-SP4, are independent. In general, there are situations in which extensive calibration is needed. For example, unstable regions, say unstable regions with some large obstacles, may be better covered with the sample points having accurate probability distributions.

In order to locate the potential candidates of new sample points, the technique for determining new sample points of the present invention is based on the intrinsic property of the observation distribution to select new sample points during the training phase. Therefore, the present invention does not rely on the decision rule, and does not have the problems caused by the wrong choice of the decision rule.

Figure 3:
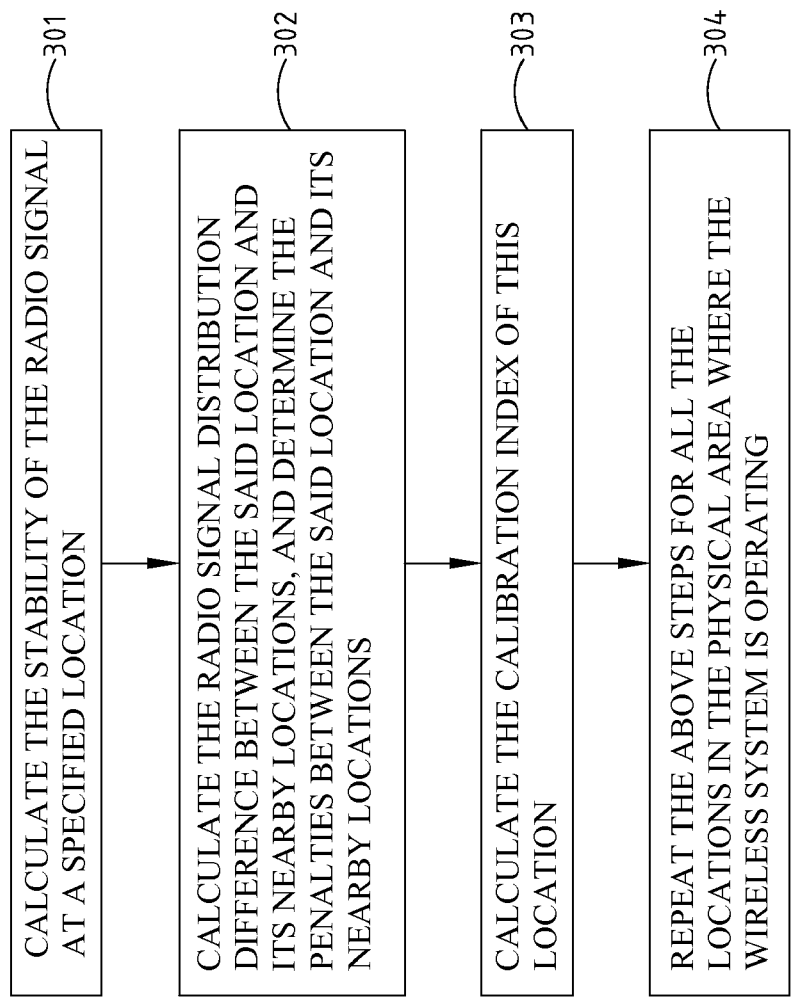
FIG. 3 shows a flowchart of the method for determining new sample points in a wireless location determination system of the present invention.

After obtaining the distribution of radio signal $o_t$ at time t at a specific location, the present invention calculates the stability of the radio signal at this location, and the probability distribution difference between the location and its nearby locations to determine whether this location is a new sample point. FIG. 3 shows a flowchart of the method for determining new sample points in a wireless location determining system.

As shown in FIG. 3, step 301 is to calculate the stability of the radio signal at a specific location. Step 302 is to calculate the radio signal distribution difference between the said location and its nearby locations, and determine the penalties between the location and its nearby locations. Step 303 is to calculate the calibration index of this location. Step 304 is to repeat the above steps for all the locations in the physical area where the wireless system is operating.

After obtaining the calibration index for all the locations, the new calibration points can be recommended based on this calibration index and the environment situation of the physical area where the wireless system is operating. The following describes the detailed operations of steps 301-304.

In step 301, the stability of the received radio signal at the location q can be described by the uncertainty of the probability distribution P(O|q) formed by the radio signal at the location q, where O represents the all possible observed outputs of the received radio signal at this location. There are many ways to measure the uncertainty, such as the information entropy by Shannon. The uncertainty is defined as follows:

when probability distribution P(O|q) is a discrete probability distribution, $$H(O|q) = -\sum_{o_i \in O} p(o_i|q) \log_2 p(o_i|q), \quad (1)$$

when probability distribution P(O|q) is a continuous probability distribution, $$H(O|q) = -\int_o p(o|q) \log_2 p(o|q) do. \quad (2)$$

In step 302, the difference between the two probability distributions P(O|q) and P(O|q̃) can be obtained by the norms of the two functions. The norm can be the $L_p$-norm, sup norm, or the average of the difference function of each possible observation. The difference function can be the logarithmic difference, or the absolute difference between two probability distributions of each common observation. A preferred difference function is the Kullback-Leibler distance, which is defined as follows: when the probability distribution P(O|q) is a discrete probability distribution, $$D_{KL}(P(O|q)\|P(O|\tilde{q})) = \sum_{o_i \in O} p(o_i|q)\log_2\left(\frac{p(o_i|q)}{p(o_i|\tilde{q})}\right); \quad (3)$$

when the probability distribution P(O|q) is a continuous probability distribution, $$D_{KL}(P(O|q)\|P(O|\tilde{q})) = \int_o p(o|q)\log_2\left(\frac{p(o|q)}{p(o|\tilde{q})}\right)do; \quad (4)$$

The Kullback-Leibler distance is not negative, and is not commutative. In other words, the Kullback-Leibler distance between the two probability distributions P(O|q) and P(O|q̃) is not the same as the Kullback-Leibler distance between the two probability distributions P(O|q̃) and P(O|q). Furthermore, the Kullback-Leibler distance between the two probability distributions P(O|q) and P(O|q̃) is zero if and only if the two probability distributions are identical. It is worth noting that all the possible observations at a specific location have strictly positive probabilities. Therefore, the zero probability will be ruled out in calculating the difference between the two probability distributions P(O|q) and P(O|q̃).

In step 303, it is worth noting that the present invention provides a mechanism w(q,q̃) for the penalty of error prediction from one location q to another location q̃. The mechanism for penalty of error prediction can be determined by a key parameter λ and the difference function between two locations q and q̃. The parameter λ can be set by the service provider according to the requirements of the actual environment. An example of the mechanism w(q, q̃) for penalty of error prediction is chosen as follows. w(q, q̃)=1−$e^{-\lambda d(q,\tilde{q})}$, where d(q,q̃) is the distance function between two locations q and q̃, and λ can be selected according to different precision requirements or different regions.

By using different λs for the different regions on the border line, the problem of the border lines having double-role attribute can be easily solved.

There are many examples for different error penalties in some areas. For example, some areas are restricted areas for children. Therefore, if the target device is erroneously predicted to be outside the restricted area while the target device is actually within the restricted area, a heavy penalty should be given. By using different λs for different areas near the location q, the requirement for the actual environment can be met. FIG. 5 shows an example of using different λs for different areas.

Figure 4:
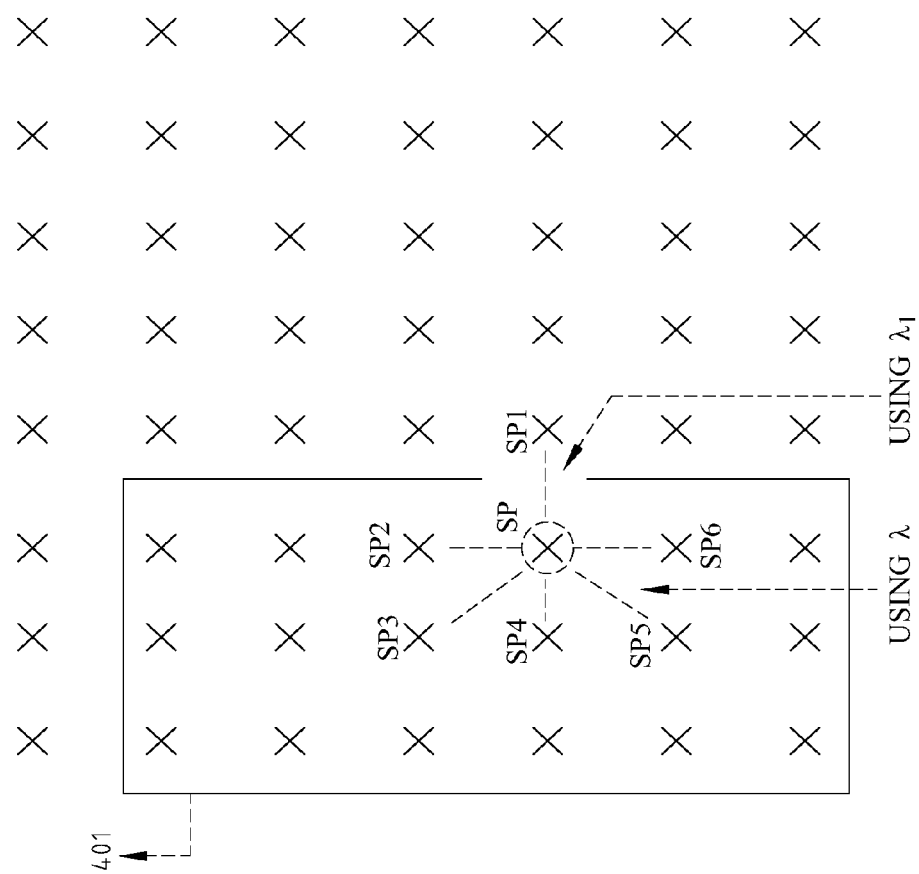
FIG. 4 shows an example of using a different λ for a different area on the border line.

As shown in FIG. 4, the location of target device in restricted area 401 is SP, and the neighboring sample points are SP1-SP6, where SP1 is outside of the restricted area. If the target device is restricted to the area 401, and the target device is erroneously predicted to be at location SP1 while the actual location is at SP, a heavier penalty must be given. In other words, the $\lambda_1$ used by the error penalty from SP to SP1 is heavier than the λ used by the error penalties from SP to SP2, SP3, SP4, SP5, or SP6.

In step 303, calibration index I(q) of a location q is a function of the following three factors: the stability of the received radio signal at a to-be-measured location, the radio signal distribution difference between the to-be-measured location and its nearby locations, and the penalty of error prediction from location q to location q̃. Calibration index I(q) of location q can be calculated as the following equation (5):

$$I(q) = \frac{1}{H_{max} - H(O|q) + \varepsilon} + \sum_{\tilde{q}} \frac{w(q,\tilde{q})}{(D_{KL}(P(O|q)\|P(O|\tilde{q})) + D_{KL}(P(O|\tilde{q})\|P(O|q)))/2 + \varepsilon}, \quad (5)$$

where $H_{max}$ is the maximum information entropy of the radio signal at location q. The maximum information entropy can be obtained by using uniform distribution, and ε is a very small constant to prevent the denominator from being zero.

In step 304, steps 301-303 are repeated for all the locations in the physical area where the wireless system is operating to obtain the calibration index for all the locations of the target device. According to the calibration index, one or more candidates for new sample points can be determined. The number of the candidates depends on the actual environment.

It is worth noting that intrinsic property of the observation distribution is used as a basis in the present invention, therefore, the present invention does not rely on the decision rule, and does not have problems from choosing the wrong decision rule.

For implementing the method with the operating flow as shown in FIG. 3, an apparatus may include a location probability distribution model, a stability module, a penalty model, and a calibration module. The location probability distribution model indicates a location probability distribution function for the target device in the wireless system. The stability module measures the stability of a received radio signal of the target device at a location q. The penalty model generates a penalty of error prediction between the location q of the received radio signal and its nearby locations. The calibration module is for producing a calibration index I(q) of the location_q.

As discussed above, the penalty model may generate the penalty of error prediction through a parameter λ and a difference function between the location q and another location q̃ of its nearby locations. The calibration module may produce the calibration index I(q) through the stability of the received radio signal at the location q, a radio signal distribution difference between the location q of the received radio signal and its nearby locations, and the penalty of error prediction from the location q to another location q̃ of its nearby locations. The stability module may measure the stability by through an information entropy for the received radio signal at the location q.

FIG. 5A to FIG. 5E show an example of the present invention. FIG. 5A shows the four probability distributions of the received radio signal at four sample points SP1-SP4 during the training phase. FIG. 5B shows the mutual distance between the four sample points SP1-SP4, where the unit is 1 meter. FIG. 5C shows the entropy at the four sample points SP1-SP4 calculated by equation (1). FIG. 5D uses the Kullback-Leibler distance of equation (4) to calculate the difference between each pair of the probability distributions at the four sample points SP1-SP4.

As aforementioned, in FIG. 5D, the difference $D_{KL}$(P(O|SP1))∥P(O|SP2))=2.2189 is different from the difference $D_{KL}$(P(O|SP2))∥P(O|SP1))=1.5361. The λ of the mechanism for penalty of error prediction w(q,q̃) is assumed to be 1. FIG. 5E uses equation (5) to calculate the index for the four sample points SP1-SP4, and the value of ε is set to $10^{-5}$.

The result of FIG. 5E shows that the calibration index for SP3 is 7.2237, which is the highest among all the four sample points SP1-SP4, followed by SP2 with the index equal to 7.0251. Both are much higher than the sample points SP1 and SP4. In other words, the recommended new sample point is SP3, or both SP3 and SP2, depending on the actual environment.

In summary, during the training phase, the present invention calculates the stability of the received radio signal and the difference between the probability distributions of the radio signal at this location and its nearby locations, to determine whether the location is the new sample point or new calibrated point. The present invention uses the intrinsic property of the observation distribution as a basis, and does not rely on the decision rule. Therefore, the present invention does not have the problem of choosing the wrong decision rule. The present invention also provides a mechanism for penalty of error prediction from a location to another location to solve the problem caused by the sample points on the border lines having double-role attribute.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for determining new sample points of a target device in a wireless system, said wireless system operating in a plurality of locations in a physical area, said method comprising the steps of:
    calculating stability of a received radio signal of said target device at a location q;
    calculating a radio signal distribution difference of said received radio signal between said location q and nearby locations of said location q, and determining a penalty of error prediction between said location q and said nearby locations;
    calculating a calibration index $I(q)$ of said location q as a function of said received radio signal;
    repeating the above steps for all said plurality of locations in said physical area; and
    determining at least one location according to the calculated calibration indexes of said plurality of locations for estimating the location of said target device;
    wherein said calibration index $I(q)$ is a function of three factors, and said three factors are said stability of said received radio signal at said location q, said radio signal distribution difference between said location q and said nearby locations, and said penalty of error prediction from said location q to another location $\tilde{q}$.

2. The method as claimed in claim 1, wherein said stability of said received radio signal at said location q is described by an uncertainty of a probability distribution $P(O|q)$ formed by said received radio signal at said location q, where O is all possible observed outputs of said received radio signal at said location q.

3. The method as claimed in claim 1, wherein said radio signal distribution difference of said received radio signal between said location q and said nearby locations is a norm function between two probability distribution functions $P(O|q)$ and $P(O|\tilde{q})$ where $\tilde{q}$ is different from q.

4. The method as claimed in claim 3, wherein said norm function is a distance function.

5. The method as claimed in claim 1, wherein said stability of said received radio signal at location q is measured by an information entropy.

6. The method as claimed in claim 1, further including the step of providing a mechanism for determining the penalty of error prediction from said location q to another location $\tilde{q}$ of said nearby locations.

7. The method as claimed in claim 6, wherein said mechanism for the penalty of error prediction is determined by a parameter $\lambda$ and a difference function between said locations q and said location $\tilde{q}$.

8. The method as claimed in claim 7, wherein said parameter $\lambda$ is variable.

9. An apparatus for determining new sample points of a target device in a wireless system, said wireless system operating in a plurality of locations in a physical area, said apparatus comprising:
    a location probability distribution model indicating a location probability distribution function for said target device in said wireless system;
    a stability computing module for measuring stability of a received radio signal of said target device at a location q;
    a penalty computing module for generating a penalty of error prediction between said location q and nearby locations of said location q; and
    a calibration module for producing a calibration index $I(q)$ of said location q as a function of said received radio signal;
    wherein said apparatus determines at least one location according to the calibration indexes of said plurality of locations produced by said calibration module for estimating the location of said target device, and said calibration module produces said calibration index $I(q)$ through said stability of said received radio signal at said location q, a radio signal distribution difference between said location q and said nearby locations, and said penalty of error prediction from said location q to another location $\tilde{q}$.

10. The apparatus as claimed in claim 9, wherein said penalty computing module generates said penalty of error prediction through a parameter $\lambda$ and a difference function between said location q and said location $\tilde{q}$.

11. The apparatus as claimed in claim 9, wherein said stability module measures the stability through an information entropy for said received radio signal at said location q.

* * * * *